(12) United States Patent
Gouzou et al.

(10) Patent No.: US 8,061,383 B2
(45) Date of Patent: Nov. 22, 2011

(54) FUEL ADDITIVE DOSING SYSTEM, APPARATUS, AND METHOD

(75) Inventors: Christophe Gouzou, Chalons en Champagne (FR); Humbert de Monts de Savasse, Reims (FR)

(73) Assignee: TI Fuel Systems SAS, Chalons en Champagne (FR)

( * ) Notice: Subject to any disclaimer, the term of this patent is extended or adjusted under 35 U.S.C. 154(b) by 1173 days.

(21) Appl. No.: 11/150,715

(22) Filed: Jun. 10, 2005

(65) Prior Publication Data

US 2006/0278283 A1    Dec. 14, 2006

(30) Foreign Application Priority Data

Jun. 9, 2005   (FR) ...................................... 05 05887

(51) Int. Cl.
*F17D 1/00* (2006.01)
(52) U.S. Cl. ......................................... 137/572; 123/1 A
(58) Field of Classification Search .................. 137/571, 137/572, 614.05; 123/1 A; 222/56
See application file for complete search history.

(56) References Cited

U.S. PATENT DOCUMENTS

| | | | |
|---|---|---|---|
| 3,227,196 A | * | 1/1966 | Meehan ............................ 141/9 |
| 3,498,324 A | * | 3/1970 | Breuning ................. 137/614.04 |
| 3,620,424 A | | 11/1971 | Grigsby |
| 4,161,160 A | | 7/1979 | Hicks et al. |

(Continued)

FOREIGN PATENT DOCUMENTS

DE    3131040 A1 * 3/1983

(Continued)

OTHER PUBLICATIONS

Preliminary Search Report—Nov. 10, 2010—FR 0505887.

*Primary Examiner* — John Fristoe, Jr.
*Assistant Examiner* — Andrew J Rost
(74) *Attorney, Agent, or Firm* — Reising Ethington P.C.

(57) ABSTRACT

A fuel additive system of a fuel delivery system of a vehicle includes an additive tank assembly, and a dosing unit in communication with the additive tank assembly to control the amount of additive dosed to the fuel tank. The additive tank assembly includes a pressurized tank of generally torispherical or ellipsoidal shape, a tank conduit with one end in communication with a sump in the pressurized tank and an opposite end extending out of the pressurized tank, and a valve in communication with the tank conduit near the opposite end thereof and being normally closed under pressure from the pressurized tank. The dosing unit includes a housing having an inlet passage in communication with the tank conduit, and a valve actuator in the inlet passage to displace the valve of the additive tank assembly to an open position once the dosing unit is assembled to the additive tank assembly.

23 Claims, 5 Drawing Sheets

U.S. PATENT DOCUMENTS

| | | |
|---|---|---|
| 4,166,441 A | 9/1979 | Grigsby |
| 4,174,694 A * | 11/1979 | Wessel et al. ............... 123/357 |
| 4,253,436 A * | 3/1981 | Dudrey ...................... 123/198 A |
| 4,621,593 A * | 11/1986 | Rao et al. ...................... 123/1 A |
| 4,971,118 A | 11/1990 | Cluff |
| 5,316,180 A * | 5/1994 | Cleland ............................ 222/56 |
| 5,331,924 A | 7/1994 | Kraus |
| 5,331,994 A | 7/1994 | Bryan, III et al. |
| 5,372,115 A * | 12/1994 | Straub et al. .................. 123/510 |
| 5,421,295 A * | 6/1995 | Lemaire et al. ............ 123/179.7 |
| 5,931,343 A * | 8/1999 | Topar et al. ...................... 222/56 |
| 6,068,672 A | 5/2000 | Watson et al. |
| 6,164,322 A | 12/2000 | Najmolhoda et al. |
| 6,216,755 B1 | 4/2001 | Neufert |
| 6,223,526 B1 | 5/2001 | Wissler et al. |
| 6,422,266 B1 | 7/2002 | Gouzou et al. |
| 6,532,918 B1 * | 3/2003 | Mang et al. ............... 123/73 AD |
| 6,779,685 B2 * | 8/2004 | Nelson ............................ 222/56 |
| 6,851,396 B2 | 2/2005 | Fromont |
| 7,837,867 B2 * | 11/2010 | McKinney ...................... 222/56 |
| 2003/0136355 A1 | 7/2003 | Gouzou et al. |

FOREIGN PATENT DOCUMENTS

| | | |
|---|---|---|
| DE | 39 18 570 A1 | 12/1990 |
| EP | 0 661 429 | 7/1995 |
| EP | 1158148 | 11/2001 |
| FR | 2823260 A | 10/2002 |
| FR | 02 13740 | 5/2004 |
| FR | 2 848 266 | 6/2004 |
| FR | 02/15448 | 6/2004 |
| JP | 1-315656 | 12/1989 |
| WO | WO 2004/096595 | 11/2004 |

* cited by examiner

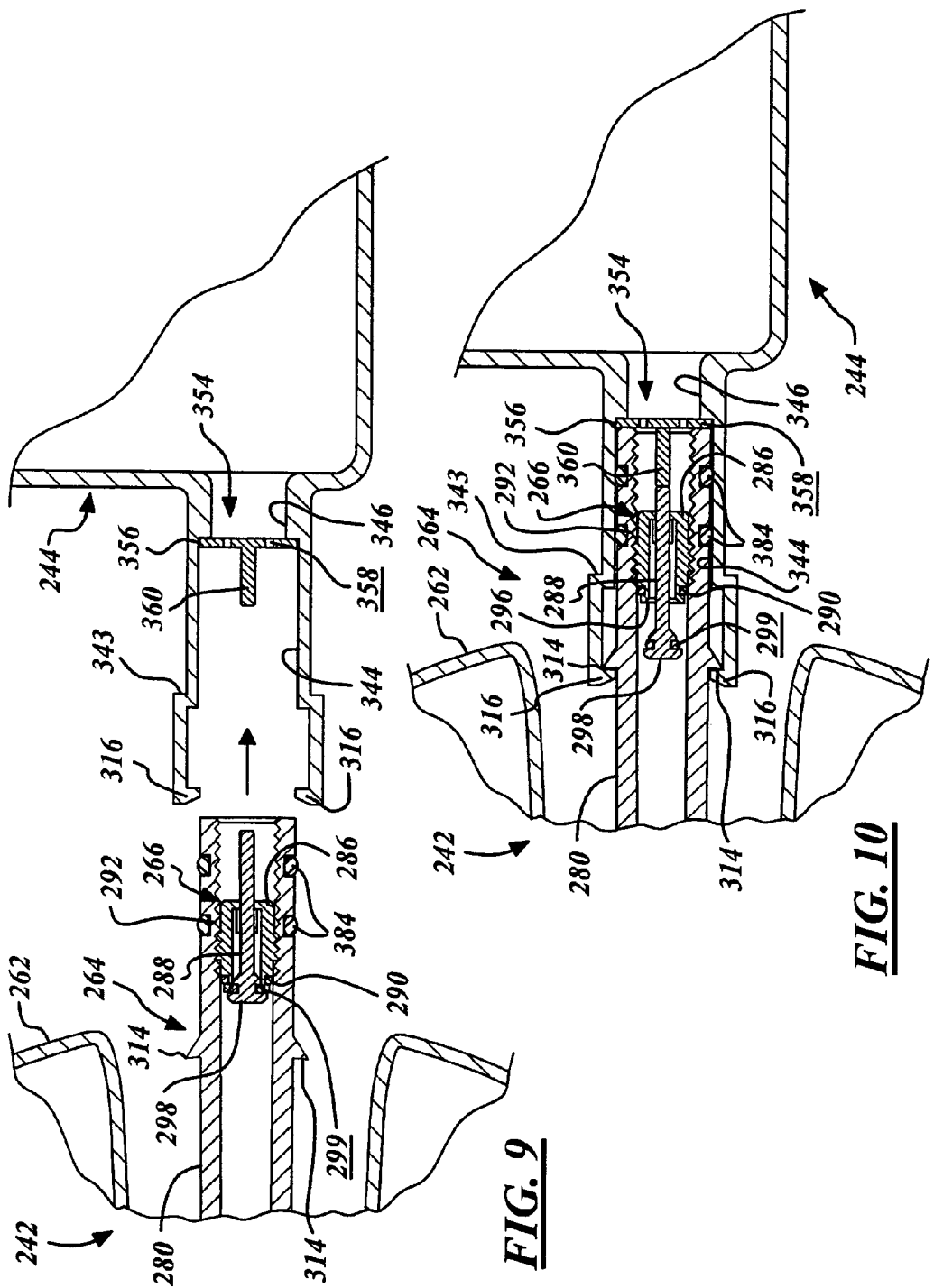

FUEL ADDITIVE DOSING SYSTEM, APPARATUS, AND METHOD

REFERENCE TO RELATED APPLICATION

Applicants claim priority of French patent application, Ser. No. 0505887, filed Jun. 9, 2005.

FIELD OF THE INVENTION

This invention relates generally to vehicle fuel delivery systems, and more particularly to a fuel additive dosing system, apparatus, and related methods for a diesel engine-powered vehicle.

BACKGROUND OF THE INVENTION

For a diesel engine-powered vehicle, it is useful to supply the engine with fuel having a precise amount of fuel additives for improving one or more performance characteristics of the vehicle. For example, it is often desirable to supply a diesel engine with an additive that improves the environmental performance of the vehicle. Typically, the additives are mixed with fuel during the fuel production process in an oil refinery. But it is increasingly desirable to provide a vehicle with a fuel delivery system having an on-board fuel additive system. Such an additive system permits a particular vehicle to have its own customized composition of fuel additives, and enables a measured quantity of the fuel additive to be introduced into the fuel tank, such as in response to a quantity of fuel being added to the fuel tank.

Unfortunately, many current fuel additive systems are unnecessarily complex, not easily serviceable, and/or may provide erratic dosing. For example, some fuel additive systems include additive tanks having electric pumps mounted therein, filler caps, vents, pressure relief valves, and complex mounting arrangements. Other additive systems are mounted inside the fuel tank and either cannot be removed for servicing or require removal of the entire fuel tank from the vehicle. Still other additive systems provide additive dosing based predominantly on estimates of pressure by way of temperature measurements. In conclusion, such additive systems may be somewhat unreliable in dosing accuracy, and complicated in design and time-consuming to service and, thus, unnecessarily expensive to buy and maintain.

SUMMARY OF THE INVENTION

A fuel additive system of a fuel delivery system of a vehicle contains an additive and provides doses of the additive to a quantity of fuel, preferably in a fuel tank of the fuel delivery system. The fuel additive system includes an additive tank assembly that is easily removable from the vehicle, and preferably also includes a dosing unit in communication with the additive tank assembly to control the amount of additive dosed to the quantity of fuel. The additive tank assembly includes a pressurized tank, a tank conduit having one end in communication with a sump of the pressurized tank and an opposite end extending out of an opening of the pressurized tank, and a valve in communication with the tank conduit near the opposite end thereof and being normally closed under pressure from the pressurized tank. The dosing unit includes a housing having an inlet passage in communication with the tank conduit of the additive tank assembly, and a valve actuator in the inlet passage to displace the valve of the additive tank assembly to an open position once the dosing unit is assembled to the additive tank assembly.

A preferred method of servicing a vehicle by removing and replacing an additive tank assembly of a fuel additive system of the vehicle, includes the following steps: disengaging a portion of the fuel additive system from a normally closed valve of the additive tank assembly, wherein the normally closed valve closes to seal a pressurized additive tank of the pressurized additive tank assembly; disassembling the additive tank assembly from the vehicle; assembling a second additive tank assembly to the vehicle; and engaging the portion of the fuel additive system to a second normally closed valve of the second additive tank assembly, wherein the second normally closed valve opens to permit flow of fluid out of a second pressurized additive tank of the second additive tank assembly.

A preferred method of dosing an additive from a fuel additive system in a vehicle fuel delivery system includes the following steps: providing a pressurized additive tank including an additive and a propellant gas; determining pressure of fluid in the fuel additive system; determining an injection period of the additive based on the determined pressure; and opening a valve in communication with the pressurized additive tank for a duration corresponding to the determined injection period. Preferably, the fluid pressure is determined by measuring the pressure with a pressure sensor.

At least some of the objects, features and advantages that may be achieved by at least certain embodiments of the invention include providing a fuel additive system that is readily adaptable to various vehicular fuel system applications; allows a pressurized additive tank to be easily removed and replaced from a vehicle; enables compact packaging of a pressurized additive tank beneath a fuel tank, improves accuracy of pressurized additive dosing; is of relatively simple design and economical manufacture and assembly, durable, rugged, reliable, and in service has a long useful life.

Of course, other objects, features and advantages will be apparent in view of this disclosure to those skilled in the art. Various other systems, devices, and methods embodying the invention may achieve more or less than the noted objects, features or advantages.

BRIEF DESCRIPTION OF THE DRAWINGS

These and other objects, features and advantages of the present invention will be apparent from the following detailed description of the preferred embodiment(s) and best mode, appended claims, and accompanying drawings in which:

FIG. 9 is a cross-sectional view of another presently preferred form of a fuel additive system, shown in a partially disassembled state; and FIG. 10 is a cross-sectional view of the fuel additive system of FIG. 8, shown in an assembled state.

DETAILED DESCRIPTION OF THE PREFERRED EMBODIMENTS

Fuel Delivery System, and Additive System and Apparatus

Figure 1:
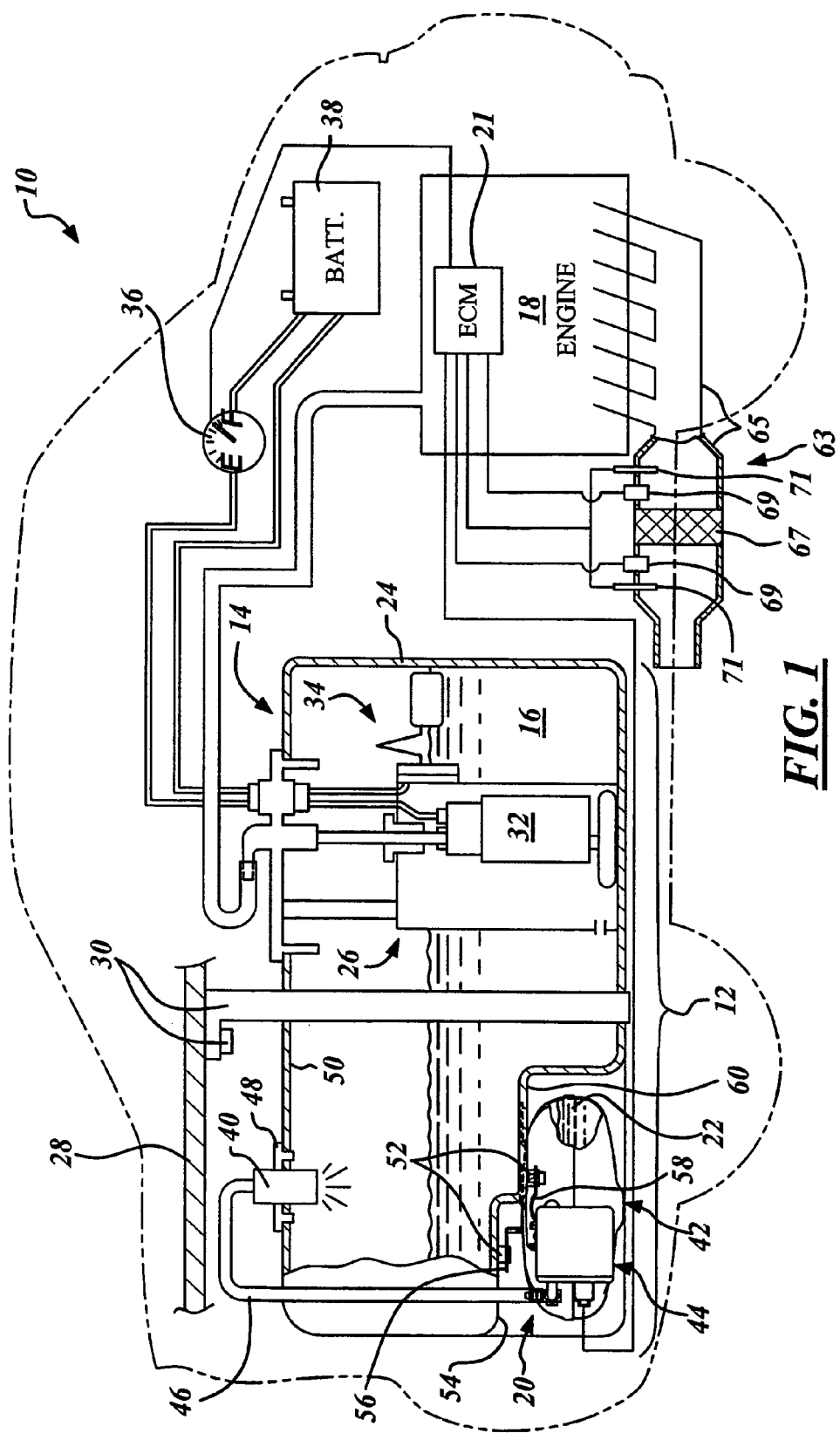
FIG. 1 is a schematic view of an automotive fuel system equipped with a presently preferred form of a fuel additive system.

Referring in more detail to the drawings, FIG. 1 schematically illustrates a vehicle 10 having a fuel delivery system 12 including a fuel tank assembly 14 that stores liquid hydrocarbon fuel 16 and supplies the fuel 16 to an internal combustion engine 18 that powers the vehicle 10. The fuel delivery system 12 further includes a fuel additive system 20 that stores a fuel additive 22 and supplies the additive 22 preferably to the fuel tank assembly 14.

The fuel tank assembly 14 includes a fuel tank 24 containing the fuel 16 and being carried by the vehicle 10, and further includes a fuel pump module 26 carried by the fuel tank 24 to deliver the fuel 16 from the fuel tank 24 to the engine 18. Those of ordinary skill in the art will recognize that the fuel tank 24, and/or various components of the fuel additive system 20, may be suitably mounted to a structural member 28 of the vehicle 10 by one or more mounting components 30, such as straps and fasteners or the like. The fuel pump module 26 is flange mounted within the fuel tank 24, and includes an electrically operated fuel pump 32 to supply the fuel 16 from the fuel tank 24 through a suitable supply line to the engine 18. The fuel module 26 further includes a fuel level sensing device 34 for sensing the level of the fuel 16 within the fuel tank 24 and sending a signal, via suitable wiring, indicative of the fuel level to a fuel level indicator 36 for observation or use by a vehicle driver within a passenger compartment of the vehicle 10. The fuel level sensing device 34 may additionally or instead be electrically communicated with an engine control module 21, vehicle electronic controller unit, controller area network, or the like. The fuel pump module 26 is powered by a vehicle battery 38 through suitable wiring.

The fuel additive system 20 stores the fuel additive 22 and supplies the additive 22 preferably to the interior of the fuel tank 24, but may supply the fuel additive 22 to any suitable location downstream of the fuel tank 24 that is in fluid communication with the engine 18. The fuel additive system 20 includes an injector nozzle 40 in communication with the interior of the fuel tank 24, an additive tank assembly 42 that stores the additive 22, and a dosing unit 44, which is in fluid communication with the additive tank assembly 42 and with the injector nozzle 40 via a conduit 46.

The injector nozzle 40 may be any suitable type of passive or actively controlled fluid device that distributes the additive 22 from the conduit 46 into the fuel tank 24. The injector nozzle 40 is preferably sealably mounted to a mounting flange 48 that is preferably sealably mounted to an upper wall 50 of the fuel tank 24.

Still referring to FIG. 1, the additive tank assembly 42 is preferably filled with any suitable additive and pressurized with any suitable propellant gas. Those of ordinary skill in the art will recognize that any suitable pressure vessel filling and pressurizing equipment may be used to fill and pressurize the additive tank assembly 42.

The pressurized additive tank assembly 42 is preferably mounted to mounting bobbins or nuts 52, which are secured to an under surface 54 of the fuel tank 24. The nuts 52 may be composed of any suitable material and may be fastened, adhered, welded, or the like to the fuel tank 24. The additive tank assembly 42 includes a first mounting bracket 56 having opposed ends each engage a mounting nut 52, and a second mounting bracket 58 that is fastened to another nut 52, which is attached to another under surface 60 of the fuel tank 24 with any suitable fastener. Accordingly, the additive tank assembly 42 is isostatically attached to the fuel tank 24, wherein the fastened opposed ends of the first mounting bracket 56 establish first and second mounting points defining a mounting line and a fastened end of the second mounting bracket defines a third mounting point to ultimately define an isostatic mounting plane.

Preferably, the vehicle engine 18 may include an engine control module 21 in electrical communication with the dosing unit 44 for enabling control of aspects of fuel additive dosing or delivery. The engine 18 may include an exhaust system 63 having an exhaust conduit 65 having disposed therein one or more vehicle emissions control components 67 such as a particulate filter and/or a catalytic converter, or the like. In addition, one or more temperature sensors 69 may be provided upstream and/or downstream of the emissions control component 67 to measure exhaust gas temperature at any given time. Likewise, one or more and/or pressure sensors 71 may be provided, preferably upstream and downstream of the emissions control component 67 to sense the pressure differential across the emissions control component 67 as, for example, an indication of blockage of the emissions control component 67. The temperature sensors 69 and pressure sensors 71 are preferably in electrical communication with the engine control module 21.

Referring now to FIGS. 2 through 6, the additive tank assembly 42 of the fuel additive system 20 includes an additive tank 62 with the first and second mounting brackets 56, 58 fixed thereto. As better shown in FIGS. 5 and 6, the additive tank assembly 42 further includes a tank conduit 64 extending through the additive tank 62 for communicating the additive 22 out of the additive tank 62, and a valve 66 that is normally closed under pressure from the pressurized fluid within the additive tank 62 to thereby seal the additive tank 62.

Referring generally to FIGS. 2 through 6, the additive tank 62 is preferably assembled from a stamped sheet metal lower shell 68 and a stamped sheet metal upper shell 70 that assemble together to define an overlap joint 72 which is preferably welded circumferentially therearound. However, the additive tank 62 may be composed of any desired metal material such as steel, aluminum, or the like, or any suitable polymer, fiber-reinforced composite, or like materials suitable for use in a fuel system. Moreover, the additive tank 62 may be constructed in any desired manner such as being blow molded or spin formed into a single component, injection molded into two components that are adhered together, or any like configurations.

The resultant generally torispherical or ellipsoidal shape of the additive tank 62 is particularly preferred to enable compact packaging of the tank 62 beneath the fuel tank 24. The term torispherical refers to a surface obtained from an intersection of a semi-spherical shell with a tangent torus, wherein a radius of the semi-spherical shell is called a "crown radius" and a radius of a cross-section of a portion of the torus is called a "knuckle radius." The term ellipsoidal refers to a quadric surface that may include a sphere, a spheroid obtained by stretching or shrinking a sphere in one direction, or a surface obtained by stretching a sphere in two mutually perpendicular directions. In any case, the shape of the additive tank 62 may be of generally torispherical, and/or ellipsoidal shape and may include depressed sump portions, openings, or other suitable geometric features.

Figure 5:
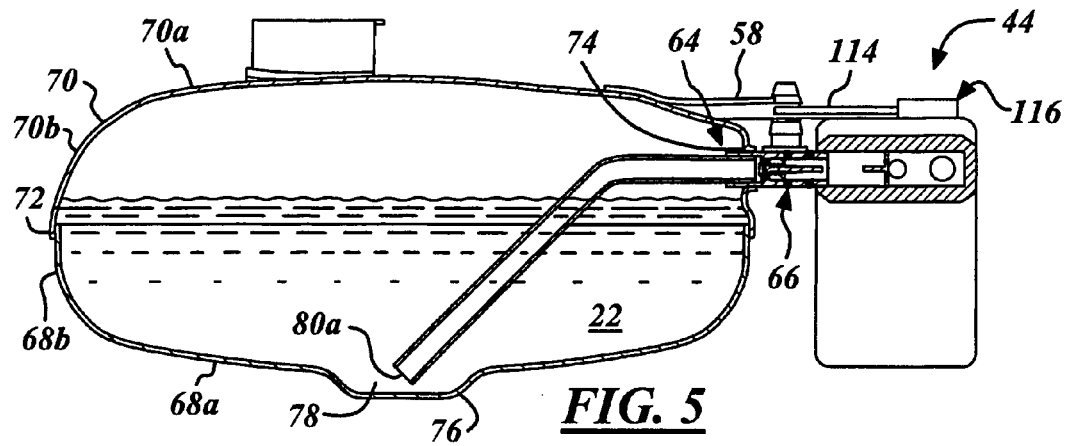
FIG. 5 is a cross-sectional view of a partially disassembled version of the fuel additive system of FIG. 2, taken along line 5-5 thereof.
Figure 6:
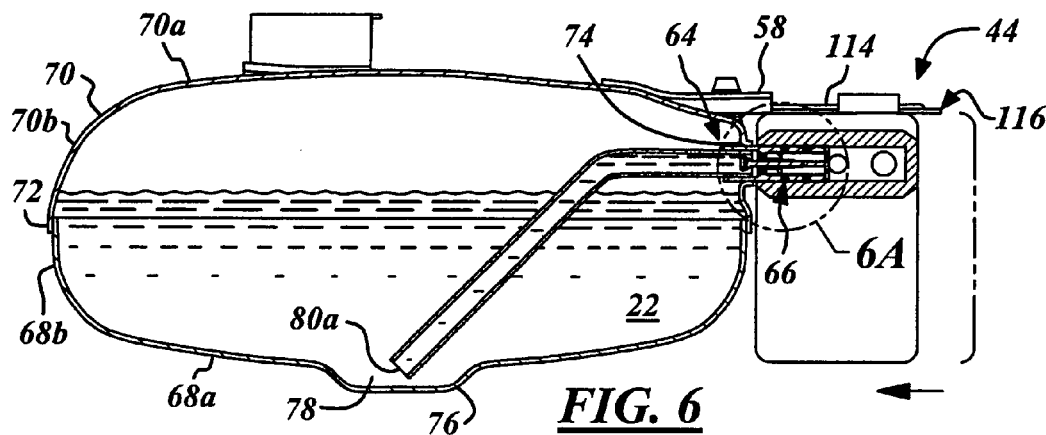
FIG. 6 is a cross-sectional view of the fuel additive system of FIG. 2, taken along line 5-5 thereof.
Figure 6A:
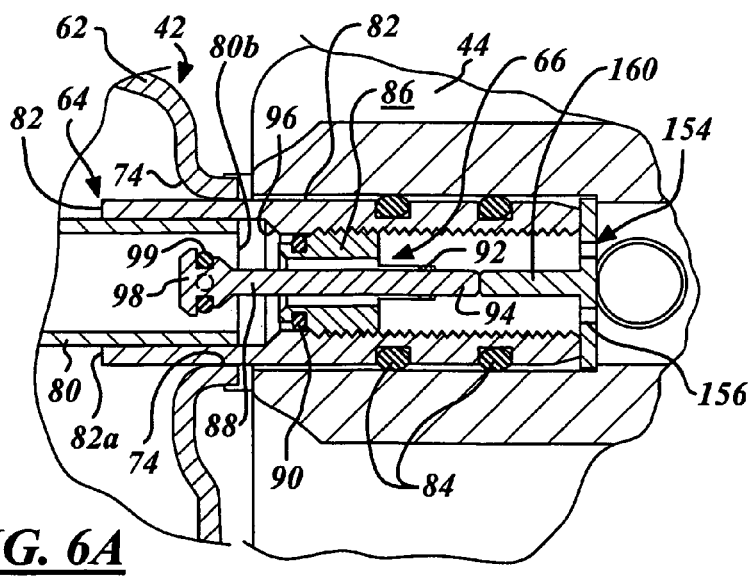
FIG. 6A is an enlarged cross-sectional view of a portion of FIG. 5.

Generally referring to FIGS. 5 through 6A, the upper shell 70 defines an upper wall 70a and an upper circumferential sidewall 70b having an opening 74 therethrough. Similarly, the lower shell 68 defines a lower circumferential sidewall 68b and a lower wall 68a having a depression 76 therein that defines a sump or low-lying collection area 78. The lower and upper shells 68, 70 thereby collectively define an interior of the additive tank 62 including the low-lying collection area 78 therein. The low-lying collection area 78 is not limited to just a sump area and may include any relatively low-lying interior portion of the additive tank 62 that enables a substantial amount of the liquid additive 22 to be delivered through the tank conduit 64.

The tank conduit 64 has one end inside of the additive tank 62 and an opposite end outside of the tank 62, and is defined by a tank tube 80 and a valve tube 82 to communicate pressurized liquid additive 22 out of the additive tank 62 and to the dosing unit 44. The tank tube 80 has one end 80a disposed within or in proximity to the low-lying collection area 78. In other words, the one end 80a of the tube 80 is disposed substantially at the low-lying collection area 78 in communication therewith. Although the sump 78 is preferred, it is not necessary, and the one end 80a of the tube 80 may simply be positioned proximate the bottom of the additive tank 62. In any case, the tank tube 80 extends generally upwardly from the bottom of the additive tank 62 and terminates in an opposite end 80b that preferably extends through the opening 74 in the additive tank 62 and into an open end 82a of the valve tube 82 of the tank conduit 64. The tank conduit 64 thus includes the tank tube 80 and the valve tube 82. The valve tube 82 is preferably welded or otherwise sealingly fixed into the opening 74 of the additive tank 62. An opposite end 82b of the valve tube 82 has a threaded inside diameter for housing the valve 66. Circumferential seals or O-rings 84 are disposed in seal grooves in an outside diameter of the valve tube 82 for sealing connection of the additive tank assembly 42 with the dosing unit 44. Although it is preferred that the tank tube 80 and valve tube 82 are: pressed together with an interference fit therebetween and overlap through the opening 74 of the additive tank 62, any other suitable arrangement is contemplated. Moreover, any portion of the tank conduit 64 may be integrally formed with the tank 62 itself and need not be a separate component or components.

The valve 66 is normally closed to seal the contents of the tank 62 therein, but may be opened upon assembly of the dosing unit 44 to the additive tank assembly 42, as will be described in further detail below. The valve 66 is preferably disposed within the valve tube 82 and includes a valve body 86 and a plunger 88 slidably received therein. The valve body 86 preferably includes a threaded outside diameter for threaded interengagement with the threaded inside diameter of the valve tube 82. A circumferentially continuous seal or O-ring 90 is disposed in a seal groove in an outer diameter of the valve body 86 for sealing with a circumferentially continuous inside surface of the valve tube 82. The valve body 86 includes a valve stem guide 92 through which a stem 94 of the plunger 88 extends and is guided, and further includes a circumferentially continuous valve seat 96 against which a valve head 98 of the plunger 88 sealingly seats by way of an O-ring 99 disposed in a seal groove in an outside diameter of the valve head 98.

Figure 2:
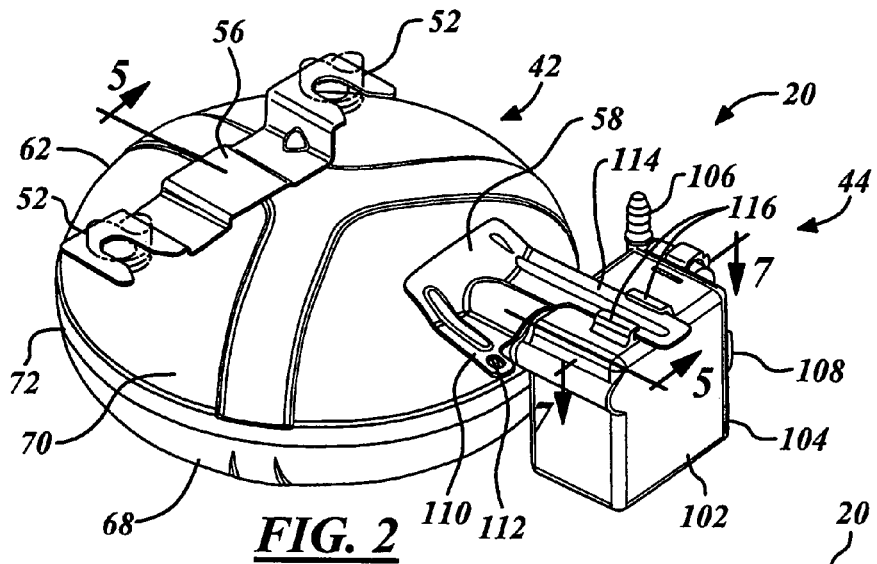
FIG. 2 is a perspective view of the fuel additive system of FIG. 1.
Figure 3:
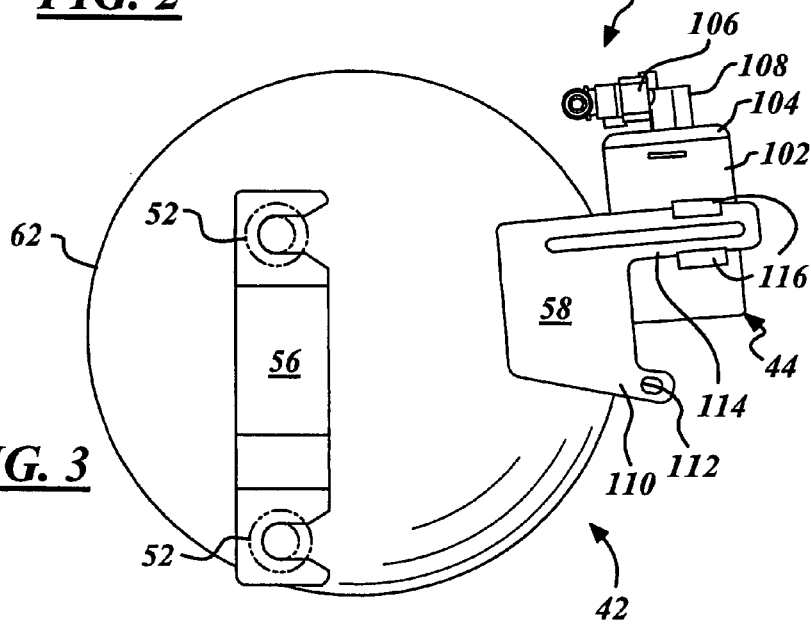
FIG. 3 is a top view of the fuel additive system of FIG. 1.
Figure 4:
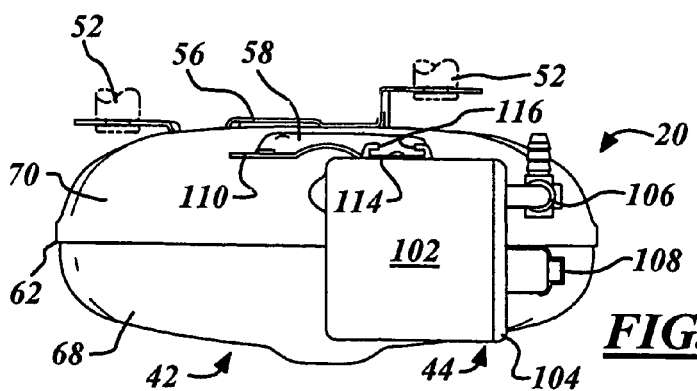
FIG. 4 is a side view of the fuel additive system of FIG. 1.

Referring to FIGS. 2 through 4, the dosing unit 44 includes a housing 102 with a cover 104 composed of any suitable materials and sealingly fixed together in any desired manner. For example, the housing 102 and cover 104 may be composed of polymeric material and may include a resilient seal (not shown) therebetween and integral fastening elements, or the housing 102 and cover 104 may be composed of polymeric or metallic materials and may be welded or fused together, or the like. The dosing unit 44 may further include a fluid outlet fitting 106 and an electrical fitting 108 mounted to and through the cover 104.

In any case, the dosing unit 44 is preferably carried by the additive tank assembly 42 by the second mounting bracket 58. The mounting brackets 56, 58 may be attached to the upper shell 70 of the additive tank 62 in any suitable manner. The first mounting bracket 56 preferably includes forked ends, as shown, for frictionally engaging the mounting nuts 52 in FIG. 1. The second mounting bracket 58 preferably includes a fuel tank mounting flange 110 having a fastener hole 112 therethrough at a distal end thereof, and a dosing unit mounting flange 114 for carrying the dosing unit 44. The housing 102 of the dosing unit 44 preferably includes a socket for cooperating with the flange 114, wherein the socket is defined by opposed and angled projections 116 that frictionally retain the flange 114 therebetween. The frictional fit between the flange 114 and the projections 116 should be at least strong enough to prevent the dosing unit 44 from being blown off of the additive tank assembly 42 under pressure from the pressurized fluid inside the tank 62. The flange 114 and projections 116 configuration enables a quick and easy anti-rotation assembly of the dosing unit 44 to the additive tank assembly 42 without damaging, the seals. Alternatively, or additionally, it is contemplated that the flange 114 and/or a portion of the housing 102 may include one or more pawls and/or detent features (not shown) that enable the housing 102 and the flange 114 to positively interengage at a certain axial position along the length of the flange 114.

Figure 7:
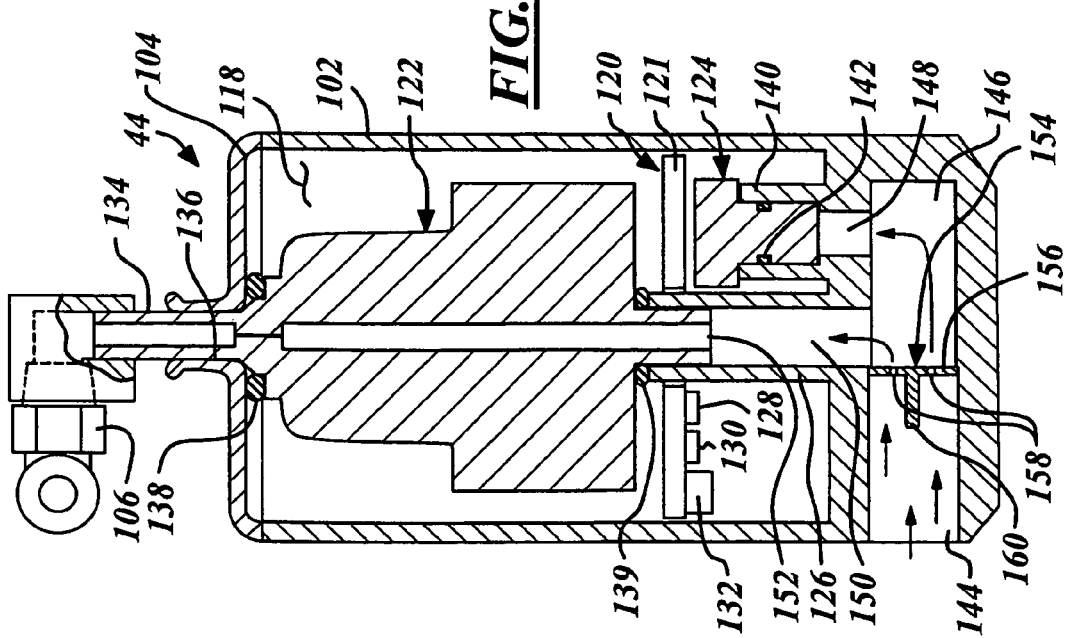
FIG. 7 is a cross-sectional view of a dosing unit of the fuel additive system of FIG. 2, taken along line 7-7 thereof.

Referring now to FIG. 7, the dosing unit 44 includes the cover 104 attached to the housing 102 to define an interior chamber 118 that houses three main components including a control module 120 for control of the dosing unit 44, a metering valve 122 for preventing, permitting, or otherwise controlling flow of additive fluid-out of the dosing unit 44, and a pressure sensor 124 for sensing the pressure of the additive fluid. First, the control module 120 is disposed within the chamber 118 and includes a circuit board 121 mounted about an integral cylindrical extension 126 of the housing 102 in any suitable manner. The control module 120 is preferably in electrical communication with the engine control module 21 of FIG. 1 out of the dosing unit 44 by suitable wiring (not shown) and to the electrical fitting 108 of the dosing unit 44.

The control module 120 includes, among other suitable components, a processor 128, a memory 130, and a temperature sensor 132 mounted to the circuit board 121. The processor 128 may be configured to execute control logic stored in the memory 130 to provide the desired functionality for the dosing unit 44. In this respect, and as used herein, the term processor 128 may encompass one or more processing units, controllers, microprocessors, micro-controllers, application specific integrated circuits (ASIC), complex programmable logic devices (CPLD), field programmable gate arrays (FPGA), any combinations of the aforementioned, and the like.

Also, the processor 128 may be interfaced with the memory 130, which is a medium configured to provide at least temporary storage of data and/or software or machine-readable instructions that provide at least some of the functionality of the dosing unit 44 and that may be executed by the processor 128. The memory 130 may include computer readable storage or media and, as used herein, the term memory may include random access memory (RAM), static RAM (SRAM), dynamic RAM (DRAM), and the like, for running software and data on the processor 128.

Finally, the temperature sensor 132 may be in electrical communication with the processor 128 for monitoring the temperature of the dosing unit 44 as an estimate of the temperature of the additive fluid, wherein the temperature may be used in calculating a desired dose of additive at any given time. Preferably, the temperature sensor 132 is a thermal resistor capable of +/−1 degree Celsius, but may be any suitable sensor.

The dosing method described herein below may be performed as a computer program and various formulas, fixed values, and/or variable input data received from sensors or the like may be stored in memory, such as in one or more look-up tables or the like. The computer program may exist in a variety of forms both active and inactive. For example, the computer program can exist as one or more software programs comprised of program instructions in source code, object code, executable code or other formats, firmware programs, or hardware description language (HDL) files, or any other suitable program.

The control module 120 of the additive system 20 either alone, or in combination with the engine control module 21 of FIG. 1, enables the vehicle 10 to have its own customized composition of fuel additives. In one example, the ratio of additive to fuel may be relatively fixed based on a predetermined engine calibration, wherein a given quantity of additive is dosed to a corresponding given quantity of fuel that is added to the fuel system. In this example, the control module may receive a fuel level signal from the fuel level sensor 34 or indicator 36 or from the ECM 21 and thereafter initiate a dosing cycle to dose a quantity of additive to the increased quantity of fuel. In a second example, the additive to fuel ratio may be relatively variable, such as a relatively low additive to fuel ratio when an exhaust filter is new, and a relatively high ratio when the exhaust filter is older, becoming blocked, and requiring a high temperature exhaust regeneration cycle enabled by higher amounts of additive. According to the second example, the functionality of the control module enables a measured quantity of the fuel additive to be introduced into the fuel tank as a function of various input parameters, such as engine speed or load, vehicle speed, fuel level, exhaust gas temperature, and the like. It is contemplated that the control module 21 could be an electronic engine control module, a separate fuel delivery system control module, vehicle electronic controller unit, controller area network, or could instead be the control module 120 of the additive system 20.

Also disposed in the dosing unit chamber 188, is the metering valve 122 which is positioned between the tubular extension 126 of the housing 102 and an inside surface of the cover 104 and has an outlet tube 134 that extends through an opening 136 in the cover 104. The metering valve 122 is suitably sealed in place by circumferential seals 138, 139. Preferably, the metering valve 122 is a solenoid type valve that is powered and controlled by and, thus, in electrical communication with the control module 120 via suitable wiring (not shown). In any case, the metering valve 122 includes a controlled passageway that is of predetermined size, calibrated to each particular additive dosing system application.

The pressure sensor 124 is sealingly coupled to a second tubular extension 140 of the housing 102 via a circumferential seal 142 and press fit, for example. The pressure sensor 124 is preferably a button type of piezoresistive sensor with a glass membrane and is in electrical communication with the control module 120 for monitoring the actual pressure of the additive fluid for use in calculating a desired dose of the additive at any given time. The pressure sensor 124 is axially retained within the housing 102, wherein the pressure sensor 124 is first assembled into the extension 140, then the circuit board 121 is assembled about the extension 126, the metering valve is assembled into the extension 126, and finally, the cover 104 is attached to the housing 102, wherein the O-rings take up any axial stack up tolerances. Accordingly, the assembly of the dosing unit 44 may be easily automated.

The dosing unit 44 also includes several fluid passages provided therein. The housing 102 includes an inlet passage formed therein and defined by a primary passage 144, and a secondary passage 146 of slightly smaller diameter than the primary passage 144. The housing 102 also includes pressure sensor passage 148 in communication with the inlet passage and the pressure sensor 124, and a metering passage 150 in communication with the inlet passage and an inlet 152 of the metering valve 122. An actuator 154 for actuating the plunger 88 of the additive tank assembly 42 is preferably press fit within the primary passage 144 and is axially located against a circumferentially continuous shoulder defined between the main passage 144 and the slightly smaller diameter secondary passage 146. The actuator 154 includes a planar base 156 having fluid holes 158 formed therethrough and further having a cylindrical projection 160 extending perpendicularly therefrom.

Additionally, the additive system 20 preferably includes a pressure relief feature to avoid overpressure conditions wherein the pressure within the additive tank assembly 42 exceeds the structural strength of the additive tank assembly 42. In one example involving electrical control, the metering valve 122 may be instructed to open by a signal from the control module 120 in response to a pressure signal received from the pressure sensor 124, wherein the pressure signal exceeds a predetermined threshold pressure such as about 8 bar.

In another example involving mechanical control, a pressure relief valve (not shown) may be provided in fluid communication between the additive tank assembly 42 and the fuel tank 24. More specifically, an individual pressure relief valve (not shown) may be positioned upstream of the metering valve 122 in fluid communication between the fuel tank 24 and additive tank assembly 42. The pressure relief valve preferably remains closed under a normal pressure range, wherein the pressure is typically on the order of about 0 to 5 bar. But when the pressure from the additive tank assembly 42 exceeds a predetermined threshold, such as about 8 bar, the pressure relief valve opens to permit the additive tank assembly 42 to vent to the atmosphere if the additive fluid is not readily combustible, otherwise to the fuel tank 24. Those of ordinary skill in the art will recognize that any available and suitable pressure relief valve design may be used. In another example, those of ordinary skill in the art will also recognize that the pressure relief valve may be integrated into the metering valve 122 to avoid use of a separate fluid path between the fuel tank 24 and additive tank assembly 42.

FIG. 5 illustrates the dosing unit 44 being assembled to the second mounting bracket 58 and to the valve tube 82 of the additive tank assembly 42. The dosing unit 44 is assembled toward the additive tank assembly 42 such that the mounting projections 116 of the housing 102 engage and slide along the dosing unit flange 114.*of* the second mounting bracket 58, and such that the end of the valve tube 82 initially fits within the primary passage 144 of the dosing unit 44 that includes the actuator 154 disposed therein. The dosing unit 44 is further assembled toward the additive tank assembly 42 until the projection 160 of the actuator 154 engages the stem 94 of the plunger 88 to displace the plunger 88 with respect to the valve body 86 and thereby open the valve 66.

Accordingly, additive fluid is permitted to flow through the tank conduit 64 through the now open valve 66 and into the inlet passage of the dosing unit 44. Any suitable retaining arrangement may be used to retain the dosing unit 44 to the additive tank assembly 42, such as a retaining pin or circlip fastener that extends through a portion of the dosing unit 44 and engages a groove (not shown) in the tank conduit 64, or retaining fingers (not shown) on the dosing unit 44 that engage angled retaining barbs (not shown) formed on the tank conduit 64 and snap into a detent retaining position behind the barbs, like that described below with reference to FIGS. 9 and 10.

As shown in FIG. 7, once the additive tank assembly and dosing unit are assembled together, the additive fluid may flow through the primary passage 144, through the holes 158 in the base 156 of the actuator 154 and into the pressure sensor passage 148 and the metering valve passage 150 by way of the secondary passage 146. The metering valve 122, when closed, prevents any backpressure of liquid additive from the fuel tank.

Similarly, the actuator 154 preferably operates as somewhat of a check valve wherein liquid additive may flow through the holes 158 toward the metering valve 122 under pressure from the pressurized additive tank 62, but liquid additive tends not to flow through the holes 158 in the opposite direction due to the lack of backpressure from the fuel tank, and the small size of the holes 158 and resultant capillary action between the additive liquid and the holes 158. It is also contemplated that the actuator 154 may instead include a check valve integrated thereto. For example, the check valve could include a disc or ball that is urged to a normally closed position by a spring. Other check valve configurations and designs known to those of ordinary skill in the art are also contemplated.

In any case, when a mechanic removes the additive tank assembly 42 from the vehicle, the valve 66 closes to prevent spraying of additive out of the additive tank, and the small actuator holes 158 tend to restrict flow to reduce dripping of additive liquid out of the dosing unit 44. In any case, when the dosing unit 44 is assembled to the additive tank assembly 42, additive fluid is supplied to the inlet end 152 of the metering valve 122. Thereafter, additive fluid may flow out of the dosing unit 44, and through the conduit 46 and injector 40 of FIG. 1 into the fuel tank 24, when the metering valve 122 is opened according to the exemplary embodiment of a dosing method, described below.

Dosing Method

In general, the dosing method may provide for fixed additive dosing based on fuel level or consumption, and/or variable additive dosing based on exhaust gas temperature and/or pressure, vehicle speed, engine speed and/or load, or the like. According to an exemplary general routine of the method, at any given time an initial level of fuel within the fuel tank 24 is sampled from the level sensor 34 output signals, and, after an interim period of some predetermined amount of time, the level of fuel 16 within the fuel tank 24 is sampled again. A comparison between the two samples is used to determine the amount of fuel that has been added to the fuel tank 24 during the interim period. If the comparison does not yield a differential value greater than some predetermined quantity of fuel, then the routine loops back to sample an initial level of fuel. But if the comparison does yield a differential value greater than some predetermined quantity of fuel, then the amount of additive needed to be mixed into the fuel tank 24 is determined. A memory-stored look up table, or the like, may be used to provide information regarding how much additive must be added to the fuel tank 24 for a given increase in fuel quantity.

According to another exemplary general routine, the additive to fuel ratio may be relatively variable and responsive to the age or condition of an exhaust filter. For example, a relatively low additive to fuel ratio may be used when the exhaust filter is new, and a relatively high ratio may be used when the exhaust filter is older, becoming blocked, and requiring a high temperature exhaust regeneration cycle enabled by higher amounts of additive. It is also contemplated that the additive to fuel ratio could increase, as a new exhaust filter ages or becomes clogged, wherein the increase may be according to a linear or non-linear function.

More specifically, an exemplary method is provided for dosing a fuel additive preferably from the pressurized additive tank 62 using the electrically controlled metering valve 122 whose opening time controls a quantity of additive fluid delivered from the additive tank assembly 42 to the fuel tank 24. In other words, by controlling the opening time of the metering valve 122, it is possible to control the quantity of additive delivered to the injector 40 and, thus, control the quantity of additive injected by the additive system 20 into the fuel tank 24. According to the dosing method, the valve opening time, or injection period, is determined preferably as a function of additive pressure and/or temperature.

In other words, the dosing method is enabled by directly or indirectly determining the pressure in the additive system by at least one of measuring or calculating the pressure of the additive in the additive system. The pressure of the additive fluid is preferably directly measured, for example by using the pressure sensor of the dosing unit. But, the pressure may instead or in addition be calculated by measuring the temperature in the system, preferably using the temperature sensor of the dosing unit in combination with the ideal gas law equation, $PV=nRT$. In the equation, P represents the pressure of the propellant gas, V represents the volume of the propellant gas, n represents the number of moles of the gas that is constant throughout the use of the additive tank, R represents a known constant, and T represents the absolute temperature of the propellant gas. The constant R may be determined on the basis of the relationship: $P_o=n_o(T_o)(R/V)$ in which: $P_o$, $n_o$, and $T_o$ represent original values of the variables P, n, and T. Based on this equation, the opening time of the metering valve 122 may be defined pursuant to the flow chart of FIG. 8. Moreover, the ideal gas law equation is also used to estimate the pressure at the end of any given dosing cycle, wherein the inherent decrease in pressure during dosing of the additive may be factored in to avoid inaccurate dosing. Accordingly, an average pressure $P_{ave}$ during the dosing cycle is preferably used in the dosing calculation.

Figure 8:
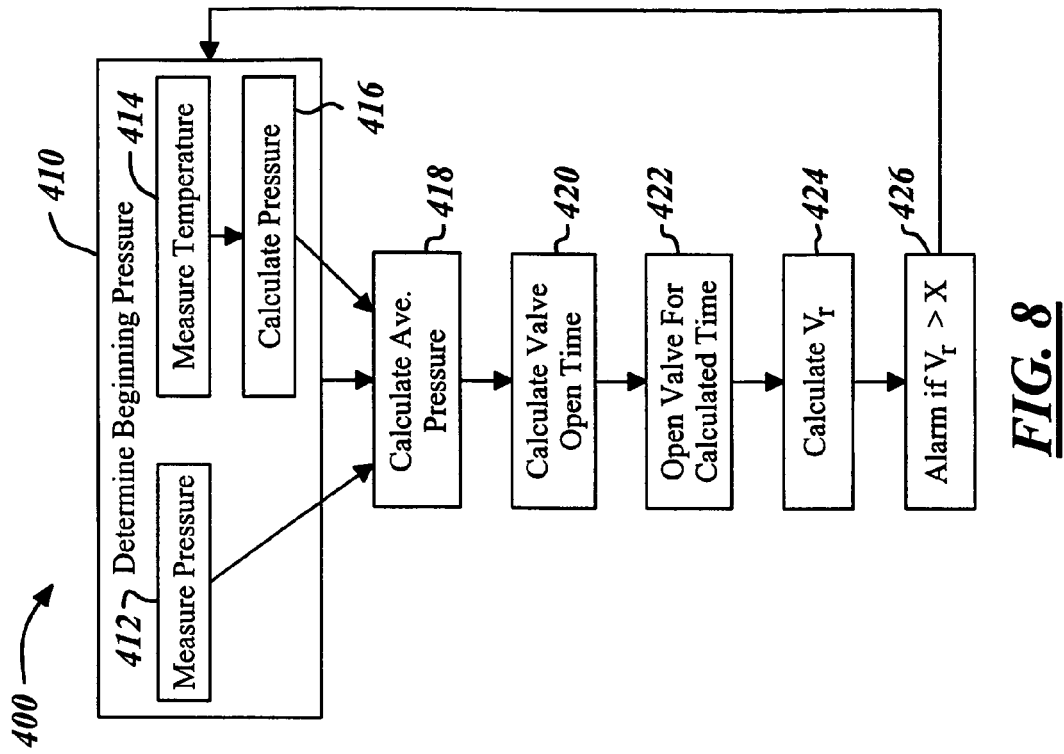
FIG. 8 illustrates a flow chart according to a presently preferred form of a method of dosing.

FIG. 8 illustrates the following steps of the method (400): determining (410) a beginning pressure $P_1$ of the additive fluid by either one or both of measuring (412) the beginning pressure $P_1$ preferably with the pressure sensor 124 or calculating (416) the pressure $P_1$ via temperature measuring (414) using the temperature sensor 132. In the latter case, temperature $T_1$ is measured at a given time t preferably just before each injection and then a beginning gas pressure is calculated as $P_1=n(T_1)(R/V_1)$.

Thereafter, the method includes calculating the average pressure $P_{ave}$ (418) over the injection period. First in this step, the pressure $P_2$ at the end of the dosing cycle is estimated using the ideal gas law equation, wherein n and R are assumed to be constant, to yield $P_2=P_1V_1/V_2$. $P_1$ is the beginning pressure; $V_1$ is the beginning volume of the propellant gas in the additive tank which is known either from an initial stored value when the additive tank is new, or from previous dosing cycle calculations; and $V_2$ is the ending volume of the propellant gas after a given volume v of additive is metered out of the additive tank assembly and dosing unit, wherein $V_2=V_1+v$. Therefore, $P_2=P_1V_1/(V_1+v)$. Next in this step, the average dosing pressure $P_{ave}$ may be calculated as a mean pressure using the equation $P_{ave}=(P_1+P_2)/2$, or may be calculated according to more complex equations if desired.

Subsequently, the method includes calculating an opening time (420) of the metering valve 122 required to obtain delivery of a desired quantity of additive liquid v. The opening time is the period of injection of the additive and may be represented by the equation t=m/Q, wherein t=time in seconds, m=mass of additive in kg, and Q=mass flow in kg/s. As discussed above, the required additive mass m may be established according to a predetermined fixed engine calibration or as a function of various input parameters, such as engine speed or load, vehicle speed, fuel level, exhaust gas temperature, and the like. The mass flow Q may be derived knowing the density of the additive and using the following modified Bernoulli's equation, $q=(A)s\sqrt{((2P/\rho)+(2gh))}$, wherein q is volumetric flow. A is a corrective coefficient related to the shape of the metered flow passage, is a relatively linear or slightly curved surface function of pressure and/or temperature, and is preferably predetermined and stored in memory as lookup table values for direct retrieval or retrieval based on linear interpolation between the stored values. The term s is the surface area of the metered flow passage in $m^2$; the term P is preferably average dosing pressure $P_{ave}$; the term p is the density of the additive in $kg/m^3$; the term g is acceleration due to gravity in $m/s^2$; and the term h is the difference in height between the surface of the additive in the additive tank and the additive injector outlet in meters m, and is considered negligible in many car applications. In other applications, however, such as truck applications, the term h may not be negligible and may need to be factored into the equation. But, the term h is treated as negligible here in order to more clearly illustrate an example. Accordingly, $q=(A)s\sqrt{(2P/\rho)}$, and the time t may be easily derived from the equation $t=m/(A)s\sqrt{(2P/\rho)}$.

Next, the method includes injecting the desired quantity of additive by opening (422) the metering valve 122 for the aforementioned calculated time t that corresponds to the additive injection period.

Then, the method may include a step for calculating the residual additive volume Vr (424) in the additive tank 62. This step may be carried out by, for example, using a predetermined value based on the known volume of additive in a new additive tank and subtracting a memorized value corresponding to cumulative total additive volume dosed to the fuel tank 24.

Finally, the method may include a step for comparing (426) a residual additive volume Vr to a predetermined and stored low limit value to determine whether or not to alert a vehicle driver with at least an initial low level alarm and, if desired, subsequent lower level alarms. Accordingly, a driver may be alerted to change the additive tank assembly 42.

In implementations where pressure P is determined as a function of temperature, the method preferably also involves storing initial pressure $P_o$, temperature $T_o$, and volume $V_o$ values measured when initially filling the additive tank 62 with additive and propellant gas. For the first additive dosing cycle, $P_1=P_oT_1/T_o$, and $P_2$ and $P_3$ may be estimated as described above for use in calculating the metering valve opening time. After the first additive dosing cycle, the pressure is estimated based on an estimate of the propellant gas volume $V_n$, wherein $V_n=V_{n-1}+v_{sum}$, and $v_{sum}$ is the cumulative volume of additive already dosed. Or, stated another way, $V_n=V-V_r$, wherein V is the overall volume capacity of the additive tank and $V_r$ is the residual additive volume. Accordingly, by storing the residual additive volume in memory from a given dosing cycle, it is possible to calculate pressure $P_{n+1}$ at the beginning of a subsequent dosing cycle.

Second Embodiment of Fuel Additive System and Apparatus

FIGS. 9 and 10 illustrate another presently preferred embodiment of an additive system. This embodiment is similar in many respects to the embodiment of FIGS. 1 through 7 and like numerals between the embodiments generally designate like or corresponding elements throughout the several views of the drawing figures. Additionally, the description of the common subject matter may generally not be repeated here.

FIGS. 9 and 10 illustrate an alternative dosing unit 244 being assembled to a tank conduit 264 of an alternative additive tank assembly 242. The additive tank assembly 242 includes an additive tank 262 and a unitary tank conduit 264 that includes a tank tube 280 extending into the tank 262 and attached thereto in any suitable manner. A valve 266 is disposed within an end of the tank tube 280 and is normally closed to seal the contents of the tank 262 therein, but may be opened upon assembly of the dosing unit 244 to the additive tank assembly 242, as will be described in further detail below. The valve 266 includes a valve body 286 and a plunger 288 slidably received therein. The valve body 286 preferably includes a threaded outside diameter for threaded interengagement with a threaded inside diameter of the tank conduit 264. A circumferentially continuous seal or O-ring 290 disposed in a seal groove in an outer diameter of the valve body 286 for sealing with a circumferentially continuous inside surface of the tank tube 280. The valve body 286 includes a valve stem guide 292 through which a stem 294 of the plunger 288 extends and is guided, and further includes a circumferentially continuous valve seat 296 against which a valve head 298 of the plunger 288 sealingly seats by way of a O-ring 299 disposed in a seal groove in an outside diameter of the valve head 298. Finally, circumferential seals or O-rings 384 are disposed in seal grooves in an outside diameter of the tank tube 280 for sealing connection of the additive tank assembly 242 with the dosing unit 244.

A housing 302 of the dosing unit 244 includes a cylindrical extension 343 having an inlet passage formed therein and defined by a primary passage 344, and a secondary passage 346 of slightly smaller diameter than the primary passage 344. An actuator 354 for actuating the plunger 288 of the additive tank assembly 242 is preferably press fit within the primary passage 344 and is axially located against a circumferentially continuous shoulder defined between the main passage 344 and the slightly smaller diameter secondary passage 346. The actuator 354 includes a planar base 356 having fluid holes 358 formed therethrough and further having a cylindrical projection 360 extending perpendicularly therefrom.

FIG. 10 illustrates the dosing unit 244 assembled to the tank conduit 264 of the additive tank assembly 242. The dosing unit 244 is assembled toward the additive tank assembly 242 such that the end of the tank tube 280 initially fits within the primary passage 344 of the dosing unit 244 that includes the actuator 354 disposed therein. The dosing unit 244 is further assembled toward the additive tank 262 until the projection 360 of the actuator 354 engages the stem 294 of the plunger 288 to displace the plunger 288 with respect to the valve body 286 and thereby open the valve 266. Finally, the dosing unit 244 is even further assembled toward the additive tank 262 such that an end of the extension 343 of the housing 302 slides over the end of the tank conduit 264 until one or more retaining fingers 316 of the housing extension 343 ramp over one or more angled retaining barbs 314 formed on the tank conduit 264 and snap into a detent retaining position behind the barbs 314 to axially retain the dosing unit 244 to the additive tank assembly 242. Accordingly, additive fluid is permitted to flow through the tank conduit 264 through the now open valve 266 and into the dosing unit 244.

Method of Servicing a Vehicle Having an Additive Tank Assembly

In general, a method is provided for servicing a vehicle by removing and replacing an additive tank assembly of a fuel additive system of the vehicle. The method includes disengaging a portion of the fuel additive system from a normally closed valve of the additive tank assembly, wherein the normally closed valve is normally closed to seal a pressurized additive tank of the pressurized additive tank assembly. The method further includes disassembling the additive tank assembly from the vehicle, and assembling a second additive tank assembly to the vehicle. The method also includes engaging the portion of the fuel additive system to a second normally closed valve of the second additive tank assembly, wherein the second normally closed valve opens to permit flow of fluid out of a second pressurized additive tank of the second additive tank assembly.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the foregoing description is not a description of the invention, but is a description of one or more presently preferred embodiments of the invention. Accordingly, the invention is not limited to the particular exemplary embodiments disclosed herein, but rather is defined solely by the claims below. In other words, the statements contained in the foregoing description relate to particular exemplary embodiments and are not to be construed as limitations on the scope of the invention as claimed below or on the definition of terms used in the claims, except where a term or phrase is expressly defined above or where the statement specifically refers to "the invention."

Although the present invention has been disclosed in conjunction with a limited number of presently preferred exemplary embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. In another example, the invention has been disclosed in conjunction with a fuel tank and fuel delivery module flange-type sealed joint. However, additional applications are contemplated for the seals, such as air-conditioning compressor applications, diesel fuel pumps, hydraulic applications, pneumatic applications, or any other applications where it is desirable to use a seal, especially an O-ring seal, and can be provided without departing from the disclosure. Indeed, the present invention is intended to embrace all such forms, ramifications, modifications, variations, substitutions, and/or equivalents as fall within the spirit and broad scope of the following claims.

What is claimed is:

1. A fuel additive system, comprising:
   a fuel level sensor sensing the level of fuel in a fuel tank and providing an electric signal indicative of the level of fuel in the fuel tank;
   a pressurized additive tank having at least one wall defining an interior receiving a pressurized propellant gas and with a low-lying collection area receiving a liquid additive pressurized by the gas with the pressure of the liquid additive changing in response to each dispensing of liquid additive from the pressurized additive tank and change in temperature of the propellant gas in the pressurized additive tank, and further having an opening through the at least one wall;
   a tank conduit having one end in communication with the low-lying liquid additive collection area of the pressurized additive tank, extending at least partially through the opening of the pressurized additive tank, and terminating in an opposite end to the outside of the pressurized additive tank; and
   a valve in communication with the tank conduit substantially at the opposite end thereof and being normally closed under fluid pressure in the pressurized additive tank;
   a dosing unit in communication with the pressurized additive tank assembly, including:
      a housing having an inlet passage in communication with the tank conduit of the pressurized additive tank downstream of the valve; and
      a valve actuator disposed in the inlet passage of the housing to displace the valve of the pressurized additive tank to an open position for the flow of pressurized liquid additive from the pressurized additive tank through the tank conduit to the inlet passage of the dosing unit;
   at least one electric sensor of an additive pressure sensor sensing the pressure of the additive in the pressurized additive tank and providing an electric signal indicative of the pressure of the additive therein or an additive temperature sensor sensing the temperature of the gas pressurizing the additive in the pressurized additive tank and providing an electric signal indicative of the temperature of the gas therein;
   a metering valve in communication with the inlet passage of the housing to control a desired amount of additive to flow therethrough to the fuel tank; and
   an electronic control module in communication with and utilizing the electric signal of the fuel level sensor to determine that a refueling event of the fuel tank has occurred and in response to the refueling event utilizing at least an electric signal of the at least one sensor to determine for an injection event a pressure of the liquid additive in the pressurized additive tank;

the control module having an electronic processor determining an injection period of time for the liquid additive for the injection event based on the determined pressure of the liquid additive in the pressurized additive tank and electric signals from the fuel level sensor; and the control module controls opening of the metering valve for the determined injection period of time for the injection event to supply liquid additive to the fuel tank.

2. The fuel additive system of claim 1, wherein the metering valve is a solenoid actuated valve.

3. The fuel additive system of claim 1, wherein the at least one sensor of the dosing unit is a pressure sensor and is in fluid communication with the inlet passage of the housing.

4. The fuel additive system of claim 1, wherein the at least one sensor of the dosing unit is an additive temperature sensor disposed therein.

5. The fuel additive system of claim 1 further comprising:
the housing of the dosing unit including a mounting socket; and
a mounting bracket attached to the pressurized additive tank and having a mounting flange for cooperation with the mounting socket of the dosing unit housing.

6. The fuel additive system of claim 1, wherein:
the tank conduit includes an exterior surface having a retaining barb; and
the housing of the dosing unit includes a retaining finger that, upon assembly to the tank conduit, resiliently deflects over the retaining barb to secure the dosing unit to the tank conduit.

7. The fuel additive system of claim 1, wherein:
the tank conduit includes a tank tube extending from the low-lying collection area within the pressurized additive tank, through the opening of the pressurized additive tank, and out of the pressurized additive tank; and
the valve is disposed within the tank tube.

8. The fuel additive system of claim 7, wherein the dosing unit mounts to and is retained by the tank tube.

9. The fuel additive system of claim 1, wherein:
the tank conduit includes:
a tank tube extending from the low-lying collection area within the pressurized additive tank, and at least partially through the opening of the pressurized additive tank; and
a valve tube having one end extending at least partially into the opening of the pressurized additive tank in fluid communication with the tank tube and further having an opposite end; and
the valve is disposed within the valve tube.

10. The fuel additive system of claim 9, wherein the dosing unit mounts to the valve tube.

11. The fuel additive system of claim 1, wherein the pressurized additive tank is of generally torispherical or ellipsoidal shape.

12. The fuel additive system of claim 1 wherein the control module:
calculates a residual volume of additive;
compares the residual volume with a predetermined low limit value; and
communicates at least one alarm signal to a vehicle driver if the residual volume is lower than the low limit value.

13. The fuel additive system of claim 1 wherein the at least one sensor includes an additive pressure sensor and determining the pressure of the liquid additive in the pressurized tank includes the control module determining a beginning pressure utilizing a signal of the additive pressure sensor.

14. A fuel delivery system, comprising:
a fuel tank containing fuel;
an additive system in fluid communication with the fuel tank to deliver a fuel additive to the fuel tank and including:
a fuel additive tank assembly mounted to an under surface of the fuel tank, comprising:
a pressurized tank having at least one wall defining an interior with a low-lying collection area, and further having an opening through the at least one wall;
a tank conduit having one end in communication with the low-lying collection area of the pressurized tank, extending at least partially through the opening of the pressurized tank, and terminating in an opposite end;
a valve in communication with the tank conduit substantially at the opposite end thereof and being normally closed under pressure from the pressurized tank; and
the fuel additive tank assembly is isostatically mounted to the under surface of the fuel tank at three points.

15. The fuel delivery system of claim 14, wherein the additive system further includes:
a dosing unit in communication with the additive tank assembly, including:
a housing having an inlet passage in communication with the tank conduit of the additive tank assembly; and
a valve actuator disposed in the inlet passage of the housing to displace the valve of the additive tank assembly to an open position.

16. The fuel delivery system of claim 15, wherein the dosing unit further comprises:
a metering valve in communication with the inlet passage of the housing to control a desired amount of additive to flow therethrough;
a pressure sensor in fluid communication with the inlet passage of the housing; and
a temperature sensor disposed therein.

17. The fuel delivery system of claim 14 wherein the fuel additive tank assembly further includes a first mounting bracket attached to the pressurized tank and having forked ends establishing first and second mounting points and a second mounting bracket attached to the pressurized tank and establishing a third mounting point.

18. A fuel additive system, comprising:
a removable additive tank assembly, including:
a pressurized tank having at least one wall defining an interior receiving a pressurized propellant gas and with a low-lying collection area receiving a liquid additive pressurized by the gas, and further having an opening through the at least one wall;
a tank conduit having one end in communication with the low-lying liquid additive collection area of the pressurized tank, extending at least partially through the opening of the pressurized tank, and terminating in an opposite end to the outside of the pressurized tank; and
a valve in communication with the tank conduit substantially at the opposite end thereof and being normally closed under fluid pressure in the pressurized tank; and
a dosing unit in communication with the additive tank assembly, including:
a housing having an inlet passage in communication with the tank conduit of the additive tank assembly downstream of the valve;
an additive temperature sensor;
a valve actuator disposed in the inlet passage of the housing to displace the valve of the additive tank assembly to an open position for the flow of pressurized liquid additive from the tank through the tank conduit to the inlet passage of the dosing unit; and a metering valve in communication with the inlet passage of the housing to control a desired amount of additive to flow therethrough to a fuel tank; and a control module utilizing a signal of the additive temperature sensor in determining a pressure in the fuel additive system by measuring the temperature in the fuel additive system;

calculating a beginning pressure based on the measured temperature, substantially at the beginning of the injection period;

the control module determines an injection period for the additive based on the determined pressure; and the control module controls opening the metering valve in communication with the pressurized additive tank for a duration corresponding to the determined injection period.

19. The fuel additive system of claim 18 wherein the control module:

estimates an ending pressure substantially at the end of the injection period; and calculates an average pressure based on the beginning and ending pressures, wherein the average pressure is the determined pressure.

20. The fuel additive system of claim 18 wherein the at least one sensor includes an additive pressure sensor and determining the pressure of the liquid additive in the pressurized tank includes the control module determining a beginning pressure utilizing a signal of the additive pressure sensor.

21. The fuel additive system of claim 20 wherein the control module:

estimates an ending pressure substantially at the end of the injection period; and calculates an average pressure based on the beginning and ending pressures, wherein the average pressure is the determined pressure.

22. A fuel additive system, comprising:

a removable additive tank assembly, including:

a pressurized tank having at least one wall defining an interior receiving a pressurized propellant gas and with a low-lying collection area receiving a liquid additive pressurized by the gas, and further having an opening through the at least one wall;

a tank conduit having one end in communication with the low-lying liquid additive collection area of the pressurized tank, extending at least partially through the opening of the pressurized tank, and terminating in an opposite end to the outside of the pressurized tank; and a valve in communication with the tank conduit substantially at the opposite end thereof and being normally closed under fluid pressure in the pressurized tank;

a dosing unit in communication with the additive tank assembly, including:

a housing having an inlet passage in communication with the tank conduit of the additive tank assembly downstream of the valve; and a valve actuator disposed in the inlet passage of the housing to displace the valve of the additive tank assembly to an open position for the flow of pressurized liquid additive from the tank through the tank conduit to the inlet passage of the dosing unit;

at least one sensor of an additive pressure sensor or an additive temperature sensor;

a metering valve in communication with the inlet passage of the housing to control a desired amount of additive to flow therethrough to a fuel tank; and a control module utilizing a signal of the at least one sensor to determine for each injection event a pressure of the liquid additive in the pressurized tank;

the control module estimates an ending pressure substantially at the end of the injection period;

the control module calculates an average pressure based on the beginning and ending pressures, wherein the average pressure is the determined pressure;

the control module determining an injection period for the liquid additive for each injection event based on the determined pressure of the liquid additive in the pressurized tank; and the control module controls opening of the metering valve for the determined injection period for each injection event to supply liquid additive to the fuel tank.

23. A fuel additive system, comprising:

a removable additive tank assembly, including:

a pressurized tank having at least one wall defining an interior receiving a pressurized propellant gas and with a low-lying collection area receiving a liquid additive pressurized by the gas with the pressure of the liquid additive changing in response to each dispensing of liquid additive from the tank and change in temperature of the propellant gas in the tank, and further having an opening through the at least one wall;

a tank conduit having one end in communication with the low-lying liquid additive collection area of the pressurized tank, extending at least partially through the opening of the pressurized tank, and terminating in an opposite end to the outside of the pressurized tank; and a valve in communication with the tank conduit substantially at the opposite end thereof and being normally closed under fluid pressure in the pressurized tank;

a dosing unit in communication with the additive tank assembly, including:

a housing having an inlet passage in communication with the tank conduit of the additive tank assembly downstream of the valve; and a valve actuator disposed in the inlet passage of the housing to displace the valve of the additive tank assembly to an open position for the flow of pressurized liquid additive from the tank through the tank conduit to the inlet passage of the dosing unit;

at least one additive temperature sensor sensing the temperature of the additive in the tank;

a metering valve in communication with the inlet passage of the housing to control a desired amount of additive to flow therethrough to a fuel tank; and a control module in communication with and utilizing a signal of the at least one sensor to determine for each injection event a pressure of the liquid additive in the pressurized tank;

the control module having a processor determining an injection period for the liquid additive for each injection event based on the determined pressure of the liquid additive in the pressurized tank; and the control module controls opening of the metering valve for the determined injection period for each injection event to supply liquid additive to the fuel tank.

* * * * *